No. 843,586. PATENTED FEB. 12, 1907.
G. J. DEAN.
CATTLE YOKE.
APPLICATION FILED JULY 8, 1905.

Witnesses:
Chas. F. Bassett
M. A. Milord

Inventor
G. J. Dean
By Frederick Benjamin
atty.

UNITED STATES PATENT OFFICE.

GEORGE J. DEAN, OF CAMPBELL, TEXAS.

CATTLE-YOKE.

No. 843,586.　　　Specification of Letters Patent.　　　Patented Feb. 12, 1907.

Application filed July 8, 1905. Serial No. 268,820.

*To all whom it may concern:*

Be it known that I, GEORGE J. DEAN, a citizen of the United States, residing at Campbell, in the county of Hunt and State of Texas, have invented certain new and useful Improvements in Cattle-Yokes, of which the following is a specification.

This invention relates to improvements in yokes for cattle; and the especial object of my improvements is to provide a device of this character which can be cheaply manufactured and readily applied to and removed from a cow or other animal to which the device is adapted.

Figure 1:
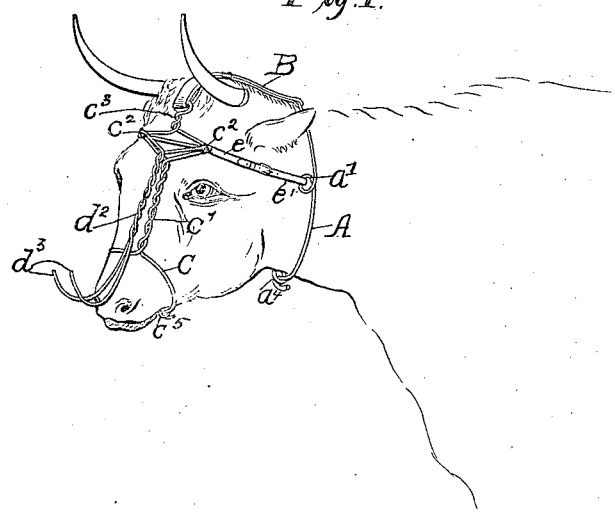
Figure 2:
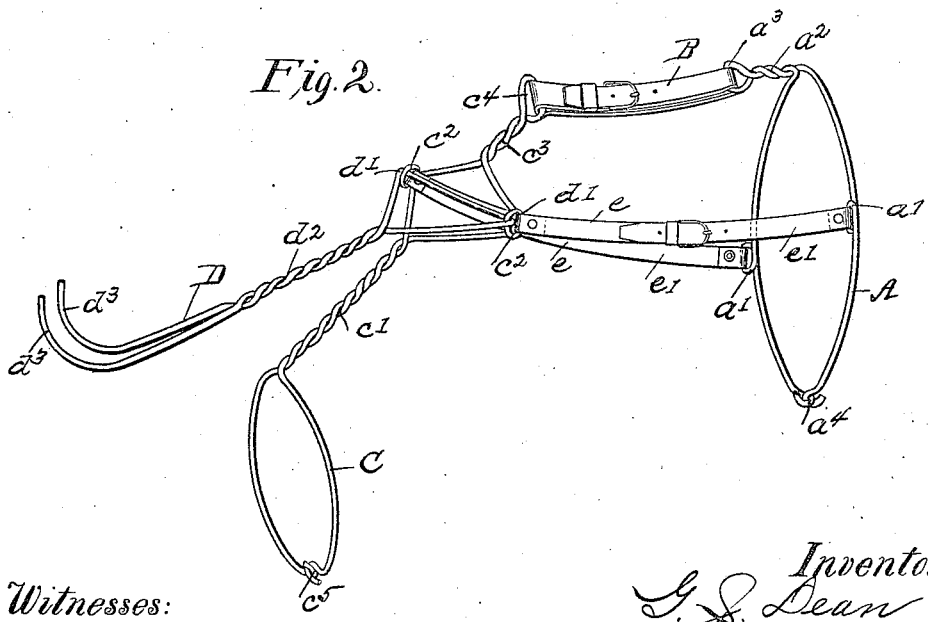

In the accompanying drawings, which form a part of this application, Figure 1 shows my improved cattle-yoke as applied to a cow, and Fig. 2 is a view of the device on an enlarged scale.

Referring to the drawings in detail, A represents the collar portion of my device, which consists of a wire bent to form an oval loop adapted to fit around the animal's neck, and said wire is also bent about midway between its upper and lower ends to form eyes $a'$ $a'$, which are oppositely placed and when the device is applied lie on each side of the animal's neck. At the upper end of the oval loop the wire is twisted together, as at $a^2$, and such twisted portion is bent substantially at right angles to the neck-loop and is formed with an eye $a^3$, which is arranged to extend forward toward the frontal bone of the animal. The ends of the wire forming the loop A are bent, as at $a^4$, to form hooks, which are joined to complete the loop, the connection being such as to be readily detached when it is desired to remove the device from the animal.

Passing through the loop $a^3$ is a strap B, which is doubled upon itself and provided with the usual buckle and means for adjusting the length of the strap and for connecting its ends. Said strap also passes through the loop $c^4$ at the upper end of the element C. This latter element consists of a single wire bent upon itself to form the eye or loop $c^4$ and twisted together, as at $c^3$, and bent to form the eyes $c^2$, which are spaced apart by diverging the wires from the end of the twisted portion. After forming the eyes $c^2$ the wires are converged and twisted together to form the portion $c'$, which is adapted to extend down along the center line of the muzzle of the animal, where the wires are again separated to form an oval loop, which is adapted to encircle the muzzle of the animal at a point where it will not interfere with the necessary movement of the jaw in feeding, and the ends of the wires are secured together by forming detachably-engaged hooks $c^5$.

D consists of a single wire bent at the points $d'$ $d'$, where it is inserted through the eyes $c^2$ $c^2$, and from said points the wires converge and are twisted together, as at $d^2$, for a portion of their length, and the free ends thus provided are curved upwardly to form the hooks $d^3$, which are adapted to extend over the end of the animal's muzzle. Connecting the eyes $a'$ with the eyes $c^2$ on each side of the animal's head are straps $e$ $e'$, which are provided with the usual buckle, and means for adjustably connecting the ends, thus adapting the device to animals of different shaped and sized heads.

It will be noted that by taking up or letting out the strap B adjustment is provided between the upper end of the loop A and the loop $c^4$, and if it be desired to remove the yoke from the animal it is only necessary to disengage the ends $a^4$ of the loop A, when it may be drawn forwardly over the horns and downwardly over the muzzle.

Having thus described my invention, what I claim as new, and desire to secure by Letters Patent, is—

A cattle-yoke consisting of a wire member bent to encircle the neck of the animal and having its ends detachably connected, a second wire member bent to embrace the muzzle of the animal and having portions extending upwardly between the animal's eyes and over the frontal bone, the ends of said wire being detachably connected, adjustable straps connecting said first and second members, and a third wire member loosely connected with said second member and extending along the upper side of the animal's muzzle and terminating in two upturned hooks.

In testimony whereof I affix my signature in presence of two witnesses.

GEORGE J. DEAN.

Witnesses:
　GEO. L. PEELER,
　CHARLES R. WAID.